US007743425B2

(12) United States Patent
Ganesh et al.

(10) Patent No.: US 7,743,425 B2
(45) Date of Patent: Jun. 22, 2010

(54) SECURITY RESTRICTIONS ON BINARY BEHAVIORS

(75) Inventors: Shankar Ganesh, Bellevue, WA (US); John G. Bedworth, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1331 days.

(21) Appl. No.: 10/836,417

(22) Filed: Apr. 29, 2004

(65) Prior Publication Data

US 2005/0256960 A1 Nov. 17, 2005

(51) Int. Cl.
G06F 7/04 (2006.01)
G06F 17/30 (2006.01)
H04L 9/32 (2006.01)
H04N 7/16 (2006.01)
B41K 3/38 (2006.01)

(52) U.S. Cl. .................. 726/30; 726/2; 380/59
(58) Field of Classification Search .............. 726/1, 726/2, 26, 27, 30; 380/59
See application file for complete search history.

(56) References Cited

U.S. PATENT DOCUMENTS

| 6,085,224 | A * | 7/2000 | Wagner | 709/203 |
| 6,321,334 | B1 * | 11/2001 | Jerger et al. | 726/1 |
| 6,931,532 | B1 * | 8/2005 | Davis et al. | 713/167 |
| 2005/0182958 | A1 * | 8/2005 | Pham et al. | 713/200 |

OTHER PUBLICATIONS

"Extensible Stylesheet Language (XSL) Version 1.0," Adler et al., W3C Recommendation Oct. 15, 2001.*
"Cascading Style Sheets level 1," Lie et al., W3C Recommendation Dec. 17, 1996, revised Jan. 11, 1999.*
Scobie P. Smith, "Create Binary Behaviors for IE with .NET", Nov. 2003, Windows Developer Network (6 pgs.)
Akiyo Nadamoto et al., "Autonomous Presentation of 3 Dimensioanl CG Contents on the Web", 2002, Proceedings 2002 IEEE International Conference on Multimedia and Expo, (4 pgs.).
Dino Esposito, "Cutting Edge", Jan. 2001, MSDN Magazine, (15 pgs.).

* cited by examiner

*Primary Examiner*—Nasser Moazzami
*Assistant Examiner*—Oscar A Louie (57) ABSTRACT

A security model restricts binary behaviors on a machine based on identified security zones. Binary behaviors can be attached to an element of a document, web-page, or email message. The binary behavior potentially threatens security on the local machine. A security manager intercepts download requests and/or execution requests, identifies a security zone for the requested binary behavior, and restricts access based on the security zone. The binary behavior can identify a security zone according to the related URL. In one example, all binary behaviors associated with a security zone are handled identically. In another example, a list of permissible binary behaviors is associated with a security zone such that only specified binary behaviors are granted access. In still another example, a list of impermissible binary behaviors is associated with a security zone such that binary behaviors that are found in the list cannot initiate access.

17 Claims, 7 Drawing Sheets

SECURITY RESTRICTIONS ON BINARY BEHAVIORS

FIELD OF THE INVENTION

The present invention relates generally to a security restriction model for binary behaviors. Security restrictions are imposed on binary behaviors based on an identified security zone such that undesirable binary behaviors are denied access for downloading and/or execution.

BACKGROUND OF THE INVENTION

The hypertext markup language (or HTML) is commonly used to define the structure for presenting content in a web-page. Web pages that are prepared using HTML can be viewed with a variety of web browser application programs. In addition, HTML web pages can be viewed on different computing systems that may otherwise be incompatible with one another. As such, HTML has been adopted throughout the computing community as a common platform for web page development to provide transportability of content between computing systems.

HTML employs a set of standard codes or "markup tags" that are used to define the format (e.g., text color, font size, etc.) and location associated with text, images, and other content. In general, a web browser builds a web page by retrieving the text file associated with the web page and interpreting the markup tags in the text file to format the web page for viewing. An example web page typically includes text, graphic images, and links to other web pages.

Although very useful in itself, HTML does not generally have any provisions for interactive behavior with the user. Dynamic HTML (or dHTML) is a technology where HTML web pages can change after the web-page is loaded. Interactive controls can be provided to the web pages by embedding executable scripts in the web page. Example executable scripting languages include JavaScript, PERL and CGI. Although scripts can be embedded in the HTML based web-page, it is typically preferable to keep scripts external to the HTML web page to keep the scripts modular and portable. In some instances, text files or inserts that include instructions written in a programming language such as C, C++, or Basic can be interpreted similar to a script. Interactive controls can also be provided to web pages by attaching binary executable programs. Example binary executables include executable programs that are written in a computing language such as Basic, C, C++, and Java, to name a few. Various "plug-in" and "active X" technologies can be installed into the web-browser to handle binary executables, as well as some scripting mechanisms.

SUMMARY OF THE INVENTION

Briefly stated, the present invention is generally related to a security model that restricts binary behaviors on a local machine based on identified security zones. Binary behaviors can be attached to an element of a document, web-page, or email message. The binary behavior potentially threatens security on the local machine. A security manager intercepts download requests and/or execution requests, identifies a security zone for the requested binary behavior, and restricts access based on the security zone. The binary behavior can identify a security zone according to the related URL. In one example, all binary behaviors associated with a security zone are handled identically. In another example, a list of permissible binary behaviors is associated with a security zone such that only specified binary behaviors are granted access. In still another example, a list of impermissible binary behaviors is associated with a security zone such that binary behaviors that are found in the list cannot initiate access.

A more complete appreciation of the present invention and its improvements can be obtained by reference to the accompanying drawings, which are briefly summarized below, and to the following detailed description of illustrative embodiments of the invention, and to the appended claims.

BRIEF DESCRIPTION OF THE DRAWINGS

Non-limiting and non-exhaustive embodiments of the present invention are described with reference to the following drawings.

DETAILED DESCRIPTION OF THE PREFERRED EMBODIMENT

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Security is an important issue to consider when moving from traditional environments, where administrators install software on client machines in a fixed location of a local disk, to an environment that allows each user to dynamically download and execute software. In some instances, users can remotely execute software. Traditional security models have been implemented to limit the execution and/or installation of software based on user permissions. Each user can be the member of one or more security roles, where the security role determines the level of access for installing and executing software. In contrast to the user centric security model, The present invention moves the security model to a paradigm where security zones associated with the software/executable is used to determine access.

Example Operating Environment

Figure 1:
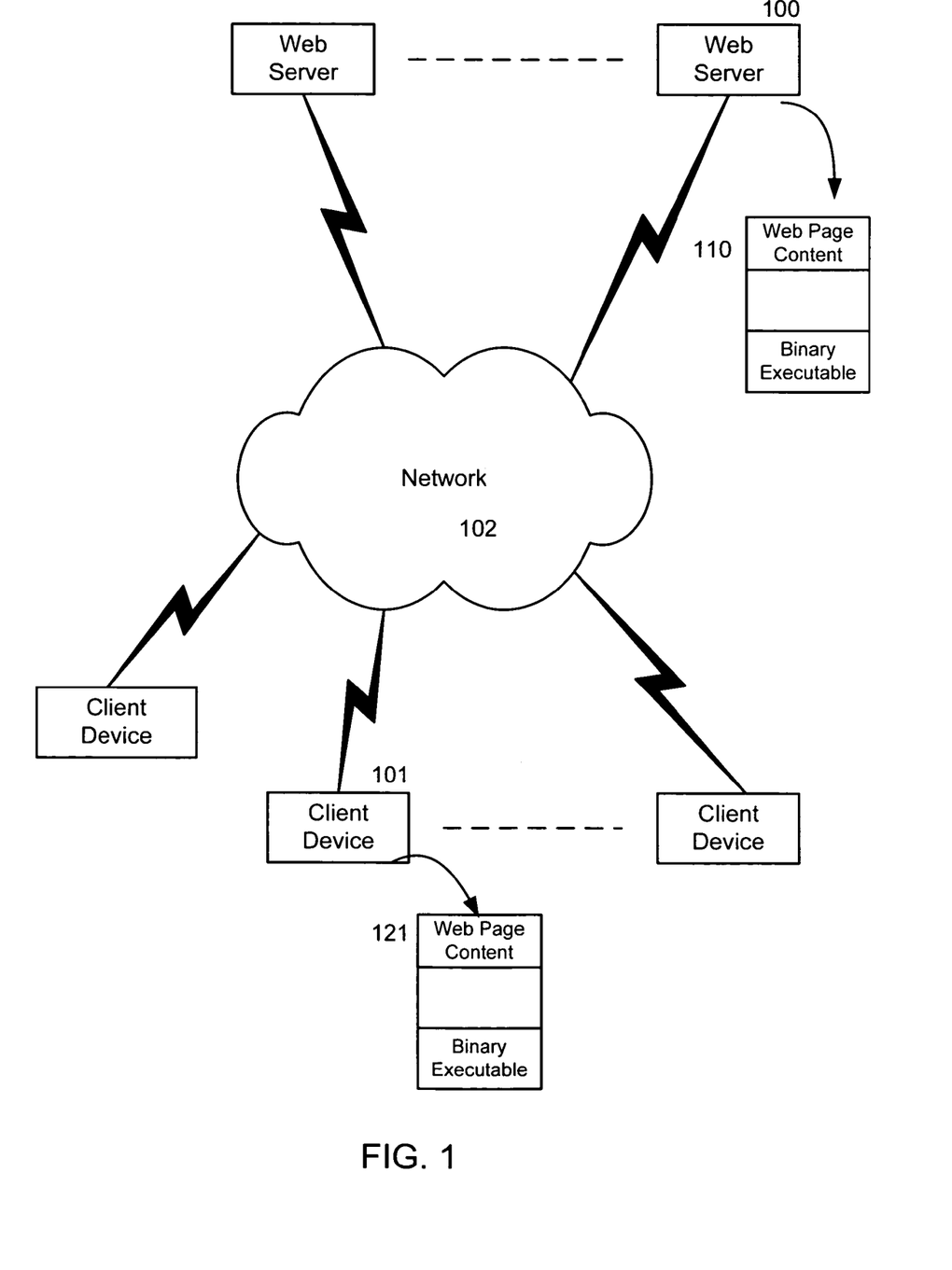
FIG. 1 is a diagram illustrating an example operating environment.

An example operating environment for the present invention is illustrated in FIG. 1. As show in the figure, one or more web server devices (100) can communicate content (110) over a network (102), where the content includes or references at least one binary behavior. One or more client devices (101) can receive the content (110) from the network (102) and create a locally cached copy (121) of the content. The locally cached content (121) is processed on the client device and parsed through a security manager before the binary behavior is permitted.

The present invention is described in the context of client and server computing devices that communicate content (e.g., web pages) over a communication medium such as an internet, intranet, or some other network connection topology. The terms "client" and "server" refer to one instance of the method. However, the same device may play both a "client" and a "server" role in different instances. Content that is provided to the client may contain binary executables that are undesirable. Before allowing a binary behavior, a security manager intercepts the request for instantiation, analyzes the requested behavior, maps the requested behavior to a security zone, and allows or refuses the binary behavior based on the security zone mapping. The security model can be utilized by a variety of applications such as email, web browsers, word processing, and other applications that may require secure access for binary behaviors.

Example Computing Device

Figure 2:
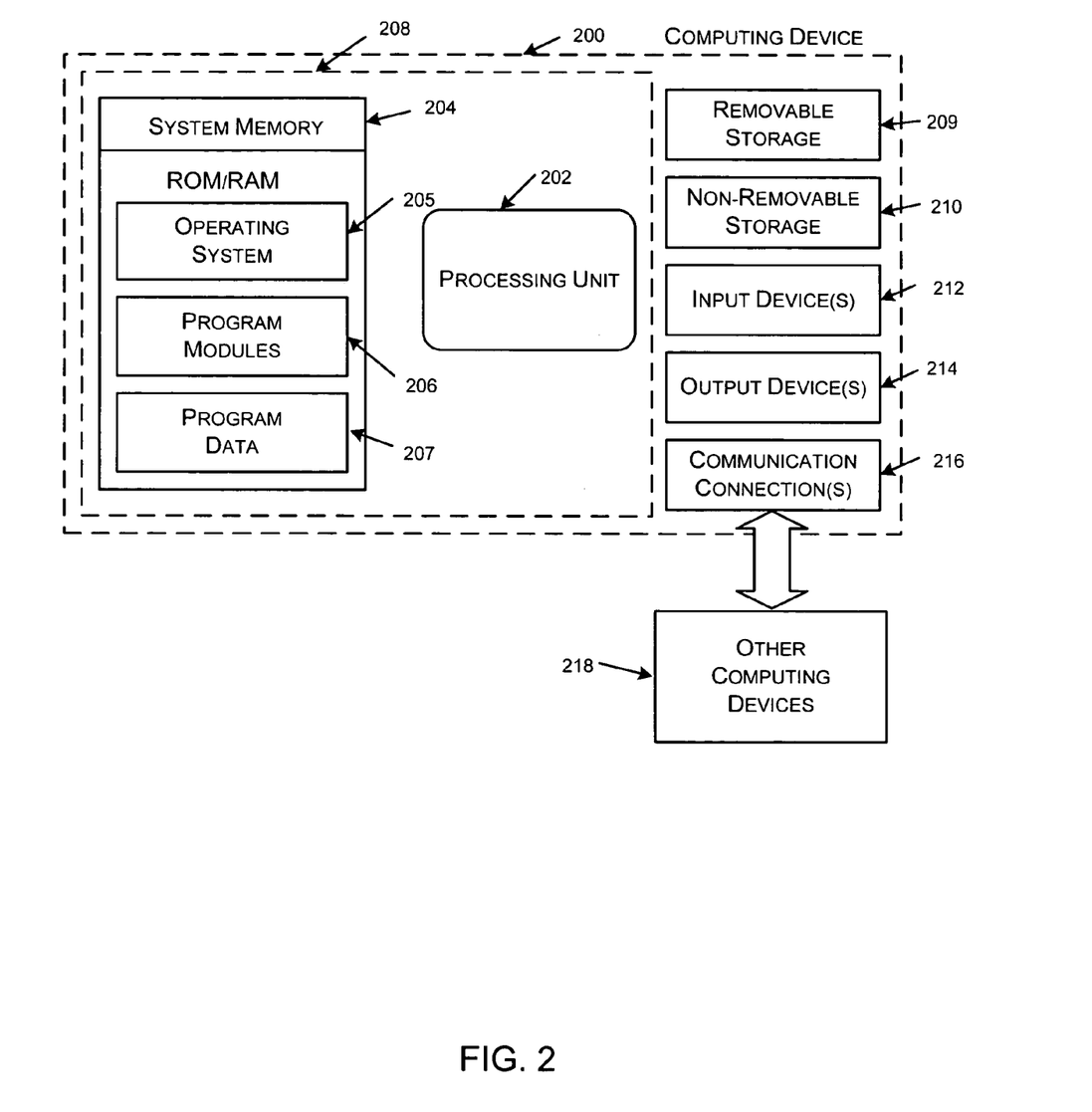
FIG. 2 is a diagram illustrating an example computing device.

FIG. 2 is a block diagram of an example computing device that is arranged in accordance with the present invention. In a basic configuration, computing device 200 typically includes at least one processing unit (202) and system memory (204). Depending on the exact configuration and type of computing device, system memory 204 may be volatile (such as RAM), non-volatile (such as ROM, flash memory, etc.) or some combination of the two. System memory 204 typically includes an operating system (205); one or more program modules (206); and may include program data (207). This basic configuration is illustrated in FIG. 2 by those components within dashed line 208.

Computing device 200 may also have additional features or functionality. For example, computing device 200 may also include additional data storage devices (removable and/or non-removable) such as, for example, magnetic disks, optical disks, or tape. Such additional storage is illustrated in FIG. 2 by removable storage 209 and non-removable storage 210. Computer storage media may include volatile and non-volatile, removable and non-removable media implemented in any method or technology for storage of information, such as computer readable instructions, data structures, program modules or other data. System memory 204, removable storage 209 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 200. Any such computer storage media may be part of device 200. Computing device 200 may also have input device(s) 212 such as keyboard, mouse, pen, voice input device, touch input device, etc. Output device(s) 214 such as a display, speakers, printer, etc. may also be included. All these devices are known in the art and need not be discussed at length here.

Computing device 200 also contains communications connection(s) 216 that allow the device to communicate with other computing devices 218, such as over a network. Communications connection(s) 216 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, microwave, satellite, infrared and other wireless media. The term computer readable media as used herein includes both storage media and communication media.

Various procedures and interfaces may be implemented in one or more application programs that reside in system memory 204. In one example, the application program includes a security manager in a local computing device (e.g., a client device) that is arranged to limit access for downloading binary behaviors from a remote computing device (e.g., a content server). In another example, the application program includes a security manager in a local computing device (e.g., a client device) that is arranged to limit access for executing binary behaviors based on a security zone associated with the binary behavior. Example application programs that may employ a security manager in memory 204 include: a web browser application, an email manager application, a contact manager application, a calendar manager application, a word processing application, a spreadsheet application, as well as others.

Binary Behaviors

The client device is operating with an application program that includes a security manager. The security manager is arranged to intercept binary behaviors before they have an opportunity for execution on the client device. Each binary behavior is mapped to a particular security zone. Security zones can be employed to restrict security access for a binary behavior that is undesirable within the zone. Application programs may have a multi-tiered security system, where each zone has separate security settings. Security zones can be set up as either a default security manager, or as a customized security manager. In one example, the security manager is an object that manages security in a web browser application. In another example, the security manager is an object that manages security in an email application. In each example, the security manager prevents unauthorized execution of binary behaviors within the zone.

Example security zones include: local intranet zone, trusted site zone, internet zone, restricted site zone, and local machine zone. The local intranet zone can be used for content that is located on an organization's intranet, where the content is given a high trust level since the content is within an organization's firewall and security. The trusted sites zone can be used for content that is located on web sites that are considered more reputable or trustworthy than other sites on the Internet. Users can use the trusted sites zone to assign a high trust level to certain sites such that the number of authentication requests is minimized. The internet zone can be used for web sites on the internet that do not belong to another zone, where potentially unsafe content may reside. The restricted sites zone can be used for web sites that contain content that can cause, or may have previously caused, problems when downloaded. Whenever potentially unsafe content is about to download from a restricted site, an alert message can be provided to the user to prevent undesirable content from downloading. The local machine zone is an implicit zone for content that exists on a local computer, which is treated with a high level of trust.

Figure 3:
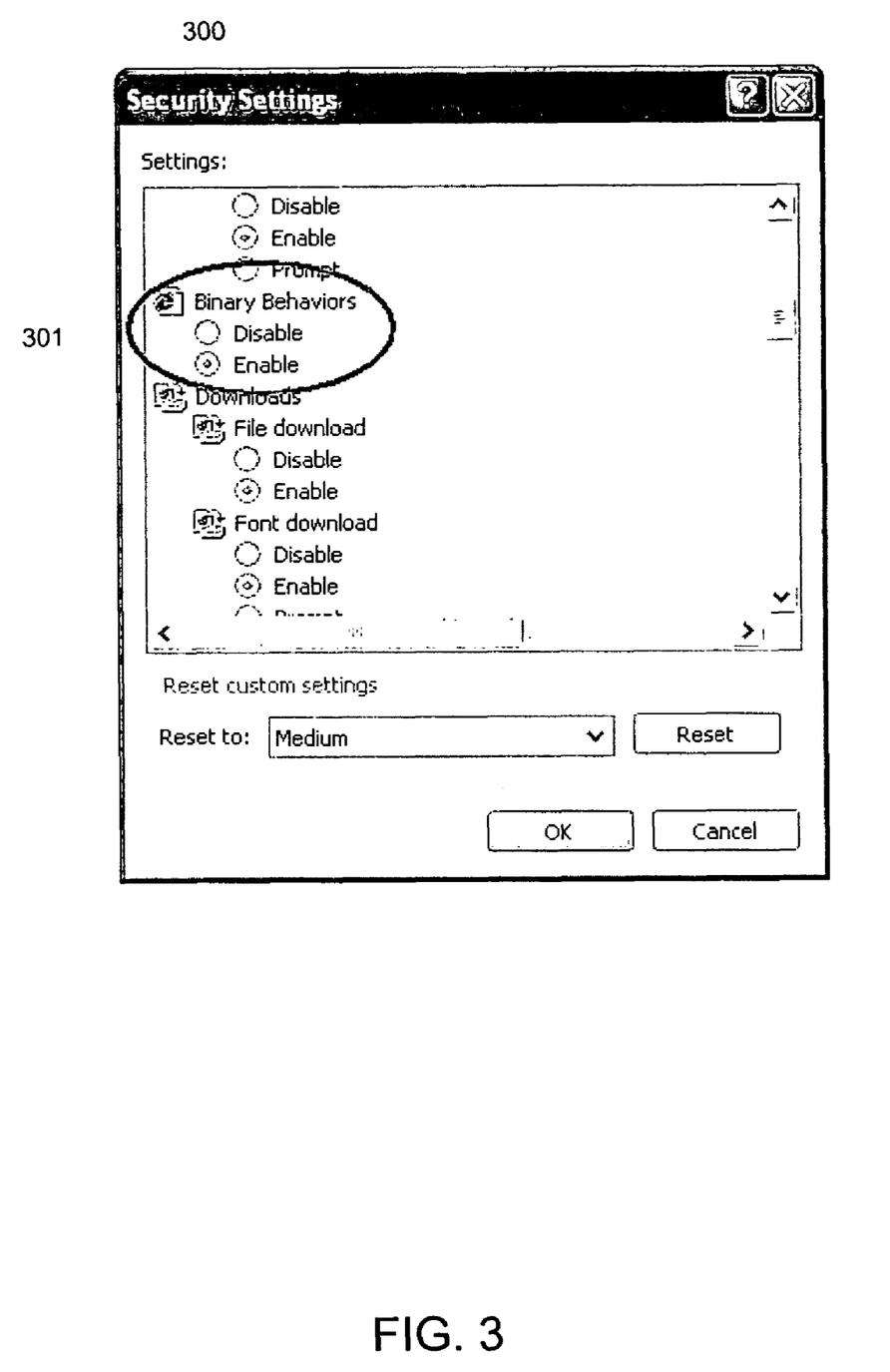
FIG. 3 is a graphic illustration of a security settings screen for an example application program.

Each security zone (aka URL security zone) is a group of uniform resource locator (URL) namespaces that are assigned to a particular level of permissions or trusts. The URL actions associated with the zone includes a corresponding set of URL policies assigned with each action. A URL action is an action that an application, such as a web browser, can take that might pose a security risk to the local computer. A URL policy is a policy that determines what permission or trust level is set for a particular URL action. URL actions can be associated with a binary behavior such as an executable (binary executable or script executable). In one example, all binary behaviors that are associated with a security zone are handled identically as either permitted or denied (e.g., see FIG. 3). In another example, a list of permissible URL actions is associated with each security zone such that only specified URL actions can initiate binary behaviors. In still another example, a list of impermissible URL actions is associated with each security zone such that URL actions that are found in the list cannot initiate binary behaviors.

Figure 4:
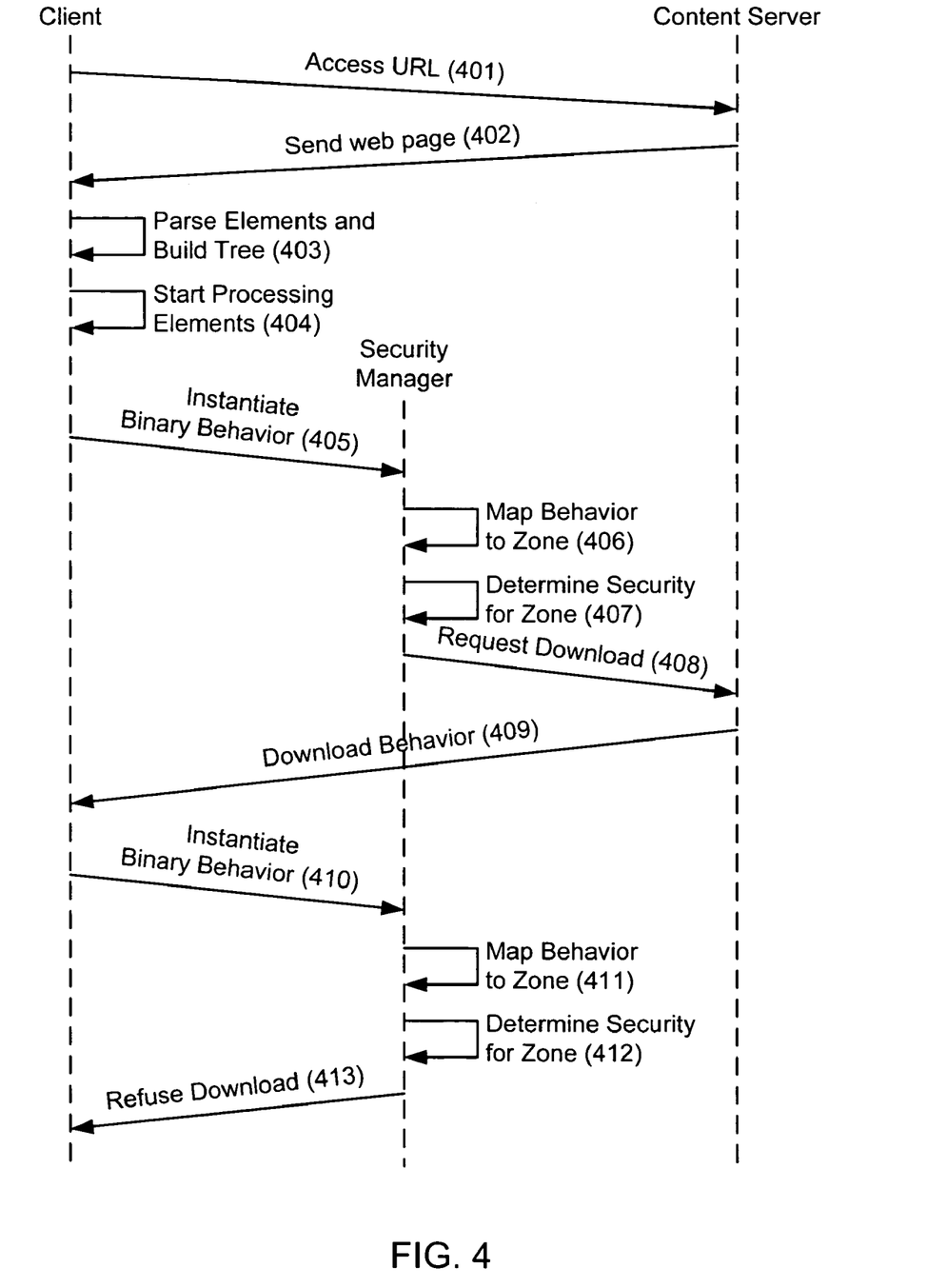
FIG. 4 is a diagram illustrating an example interaction between a client device and a server device.

FIG. 4 is a diagram illustrating an example interaction between a client and server that is arranged according to at least one aspect of the present invention. For this example, the client application is a web browser application. However, other applications including email, word processing, and others are equally applicable.

A client can initiate a request for access to a particular URL at step 401. A content server responds to the client at step 402 by sending content in the form of a web page to the client. At step 403, the client receives the content and parses each element in the page to build a tree identifying each element and any associated behavior. After the element tree is built, the client device processes each element at step 404, where the behavior for each element is rendered.

In one example, the security manager intercepts the request to instantiate a binary behavior (a URL action) at step 405. At step 406, the security manager maps the requested behavior to a particular security zone. At step 407, the security settings associated with the particular security zone are reviewed to determine if the requested behavior should be allowed to execute (or download). When the requested binary behavior is permissible in the security zone, the security manager permits the request to instantiate the binary behavior to pass to the content server as shown by step 408. The content server communicates the binary behavior to the client device by downloading as shown by step 409.

In another example, the security manager intercepts the request to instantiate a binary behavior (a URL action) at step 4105. At step 411, the security manager maps the requested behavior to a particular security zone. At step 412, the security settings associated with the particular security zone are reviewed to determine if the requested behavior should be allowed to execute (or download). When the requested binary behavior is impermissible in the security zone, the security manager denies the request to instantiate the binary behavior, and the security manager refuses to download the requested binary behavior at step 413.

Behaviors can be attached to an HTML element (custom tag, a known tag, a text element, etc) and control the rendering associated with that element. Script based behaviors are good for simple behaviors. Binary behaviors include: native code that is compiled into a binary executable, COM objects, COM+ objects, and any other binary executable. Native code from languages such as Basic, C and C++ can be compiled into binary executables. Because it is compiled, a binary element behavior has increased performance over a script-based element behavior. Script-based element behaviors can be re-implemented as binary element behaviors. Unlike script-based element behaviors, binary element behaviors can have access to the entire operating system so they can do anything an ordinary application can, including accessing the file system.

Example Binary Behavior Process Flow

Figure 5A:
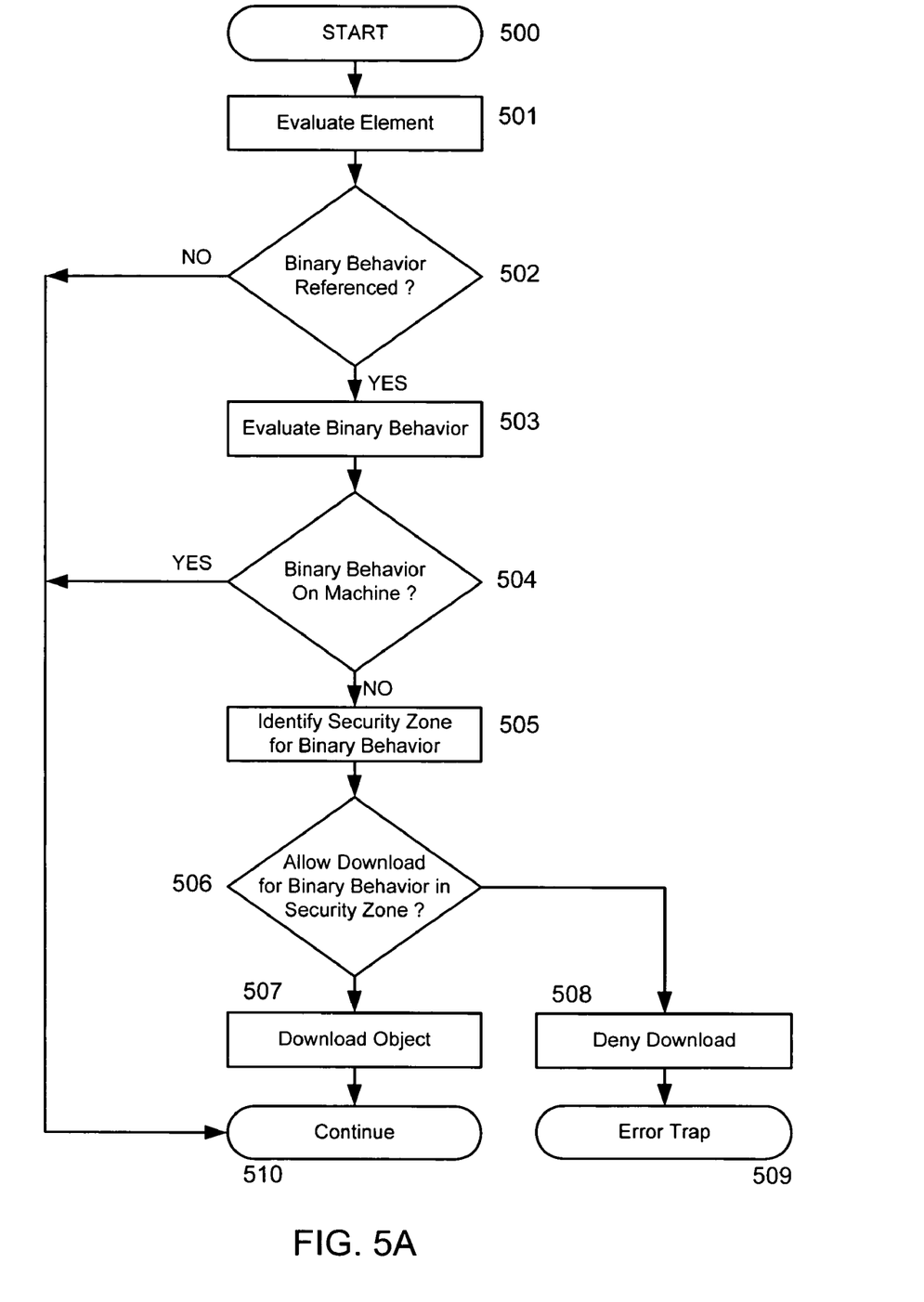
FIGS. 5A-5C are diagrams of an example process flow for a client device, arranged according to at least one aspect of the present invention.
Figure 5B:
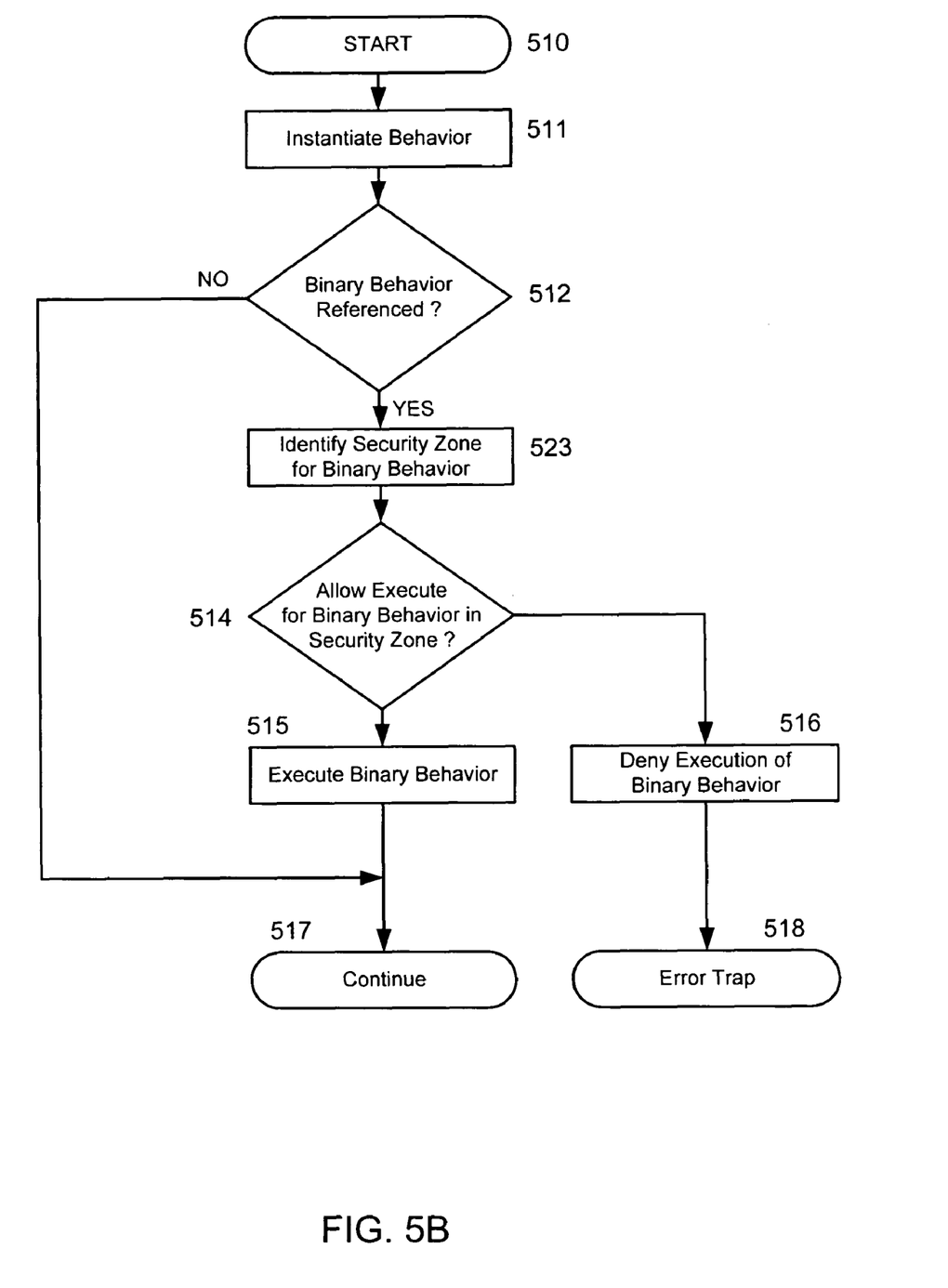
Figure 5C:
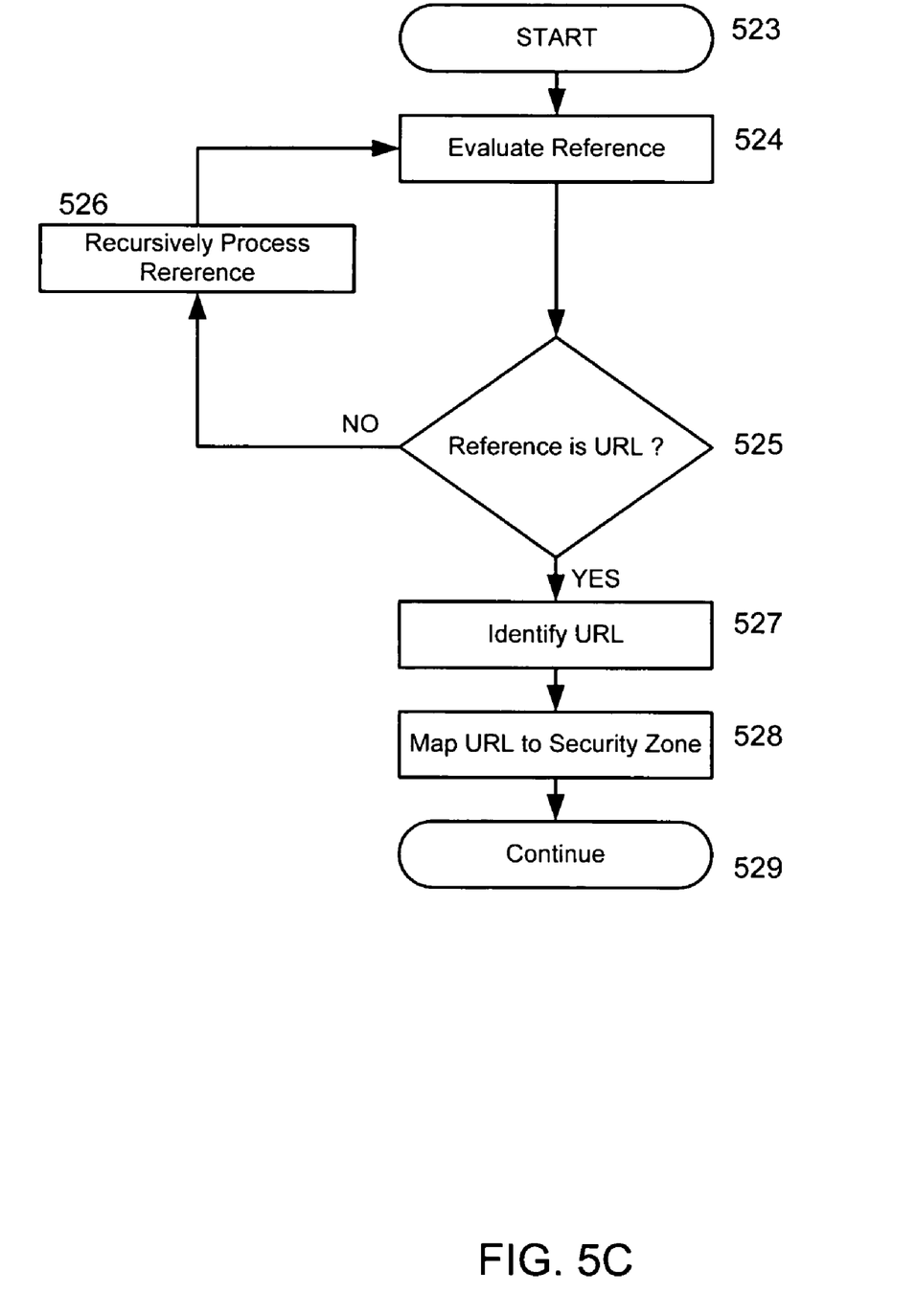

FIGS. 5A-5C are diagrams of an example process flow for a client device (or machine), arranged according to at least one aspect of the present invention. For this example, each element associated with a particular document (e.g., word processing, email, spreadsheet, web-page, etc.) is initially parsed to build a tree as described in FIG. 4. As each element from the tree is processed (e.g., during rendering), the process steps from FIGS. 5A-5C can be initiated.

FIG. 5A illustrates processing steps 500-510, which corresponds to an example security process for permitting downloading of objects that are binary executables. Processing for FIG. 5A beings at block 500 and continues to block 501.

At block 501, the selected element is evaluated to identify any related binary behaviors. Processing flows from decision block 502 to block to block 510 when no binary behavior is associated with the selected element. Otherwise, processing continues from decision block 502 to block 503 when the selected element has a related binary behavior.

At block 503, the binary behavior associated with the selected element is evaluated to determine if the executable is resident on the machine. Processing flows from decision block 504 to block to block 510 when the binary behavior is resident on the machine. Otherwise, processing continues from decision block 504 to block 505 when the binary behavior for the selected element is not currently found on the machine.

At block 505, a security zone for the binary behavior associated with the selected element is identified. Processing flows from decision block 506 to block to block 507 when the binary behavior is granted access within the identified security zone. Otherwise, processing continues from decision block 506 to block 508 when the binary behavior is denied access within the identified security zone.

At block 507, the object associated with the binary behavior is downloaded (e.g., from the content server) and stored on the machine. Processing continues from block 507 to block 510.

At block 508, the object associated with the binary behavior is denied access for downloading. Processing continues from block 508 to block 509, where an optional error trap routine can display an error message, prompt the user for a security override, or provide some other procedure as may be desired.

FIG. 5B illustrates processing steps 510-518, 523, which corresponds to an example security process for permitting execution of binary executables. Processing for FIG. 5B beings at block 510 and continues to block 511.

At block 511, the behavior for the selected element is instantiated. Processing flows from decision block 512 to block to block 517 when the behavior does not correspond to a binary behavior. Otherwise, processing continues from decision block 512 to block 523 when the behavior for the selected element is a binary behavior.

At block 523, a security zone for the binary behavior associated with the selected element is identified. Processing flows from decision block 514 to block to block 515 when the binary behavior is granted access within the identified security zone. Otherwise, processing continues from decision block 523 to block 516 when the binary behavior is denied access within the identified security zone.

At block 515, the binary behavior associated with the selected element is executed on the machine. Processing continues from block 515 to block 517.

At block 516, the binary behavior is denied access for execution. Processing continues from block 516 to block 518, where an optional error trap routine can display an error message, prompt the user for a security override, or provide some other procedure as may be desired.

FIG. 5C illustrates processing steps 523-529, which corresponds to an example process for identifying a security zone for a binary behavior. Processing for FIG. 5C beings at block 523 and continues to block 524.

At block 524, the reference to the binary behavior is evaluated to determine if it corresponds to a standard format URL (e.g., an HTTP address, an IP address, an FTP address, a drive letter path, etc). Processing flows from decision block 525 to block to block 526 when the reference to the binary behavior is not in a standard form. Otherwise, processing continues from decision block 525 to block 527 when the reference for the binary behavior corresponds to a standard format URL.

At block 526, the reference to the binary behavior is recursively processed to identify another reference. Processing continues from block 526 to block 524 such that a standard format URL is located for the binary behavior by iteratively processing the reference.

At block 527, a URL for the binary behavior is identified. Continuing to block 528, the identified URL is mapped to a security zone. In one example, every identified URL associated with a security zone is included in a list. In another example, a domain associated with the URL is mapped to a particular security zone. Processing continues from block 528 to block 529, where processing can return to another process.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method of casting security on a binary behavior that is associated with an element in a document, comprising:

processing the element to identify an association with the binary behavior, the binary behavior configured to cause a request to execute a binary executable external to the document, the binary behavior configured using a compiled language that is non-script based to enable access to an operating system and attached to a hypertext markup language (HTML) element;

intercepting the request before execution of the binary executable;

determining whether the binary behavior corresponds to a standard format uniform resource locator (URL) by at least tracing a markup associated with at least one style attribute to locate the URL;

identifying a security zone that is associated with the URL, wherein the URL is associated with a domain; and selecting a permission level for the binary behavior in the identified security zone to selectively control execution of the binary executable, including at least one of: selecting the permission level to permit access when an identifier associated with the binary behavior is located in a permission list for the identified security zone, selecting the permission level to deny access when the identifier associated with the binary behavior is located in a deny list for the identified security zone, selecting the permission level to permit access when binary behaviors are enabled in the identified security zone, or selecting the permission level to deny access when binary behaviors are disabled in the identified security zone.

2. The computer implemented method of claim 1, wherein the element corresponds to at least a portion of: a document, a web-page, and an email message.

3. The computer implemented method of claim 1, wherein the compiled language comprises at least one of: a compiled C program, a compiled BASIC program, a compiled C++ program, a COM object, or a COM+ object.

4. The computer implemented method of claim 1, wherein determining whether the binary behavior corresponds to a standard format uniform resource locator (URL) comprises: recursively tracing a markup associated with the at least one style attribute to locate the URL.

5. The computer implemented method of claim 1, wherein the uniform resource locator (URL) corresponds to at least one of: an HTTP address, an FTP address, an IP address, and a drive letter file path.

6. The computer implemented method of claim 1, wherein identifying the security zone that is associated with the URL comprises: matching at least a first portion of the URL to a domain for a first security zone, locating at least a second portion of the URL on a permission list for a second security zone, and locating at least a third portion of the URL on a deny list for a third security zone.

7. A computer readable storage medium comprising computer-executable instructions configured to cast security on a binary behavior that is associated with an element in a document on a computing device, the computer-executable instructions configured to:

evaluate the element to identify a binary executable external to the document that is referenced by the binary behavior associated with the element, the binary behavior configured using a compiled non-script-based code language that enables attachment to a hypertext markup language (HTML) element and access to an operating system, wherein the compiled non-script-based language includes at least a COM object or a COM+ object;

intercept a request, during rendering of the element in the document, for the binary executable to prevent execution of the binary executable by the computing device;

identify a security zone for the binary behavior;

retrieve a security setting for the binary behavior in the identified security zone;

deny retrieval of the binary executable for execution on the computing device when the retrieved security setting denies access for the binary behavior in the identified security zone; and grant retrieval of the binary executable for execution on the computing device when the retrieved security setting grants access for the binary behavior in the identified security zone, wherein the binary executable is associated with the identified binary behavior.

8. The computer readable storage medium of claim 7, further comprising computer-executable instructions configured to identify the security zone for the binary behavior by retrieving a style sheet associated with the element, and identifying at least one style attribute in the style sheet that is associated with the binary executable.

9. The computer readable storage medium of claim 7, further comprising computer-executable instructions configured to retrieve the security setting for the binary behavior in the identified zone comprising at least one of: selecting the security setting to permit access when an identifier associated with the binary behavior is located in a permit download list for the identified security zone, selecting the security setting to deny access when the identifier associated with the binary behavior is located in a deny download list for the identified security zone, selecting the security setting to permit access when download binary behaviors is enabled in the identified security zone, and selecting the security setting to deny access when download binary behaviors is disabled in the identified security zone.

10. The computer readable storage medium of claim 7, further comprising computer-executable instructions configured to:
instantiate a particular binary behavior that is associated with a particular element;
identify a particular security zone for the particular binary behavior;
retrieve another security setting for the particular binary behavior in the identified particular security zone;
deny execution of a particular binary executable on the local machine when the retrieved other security setting denies access for the particular binary behavior in the identified particular security zone; and
grant execution of the particular binary executable on the local machine when the retrieved other security setting grants access for the particular binary behavior in the identified particular security zone.

11. The computer readable storage medium of claim 10, further comprising computer-executable instructions configured to retrieve the other security setting for the particular binary behavior in the particular identified zone comprising at least one of: instructions to select the particular security setting to permit access when an identifier associated with the particular binary behavior is located in a permit execution list for the identified security zone, instructions to select the particular security setting to deny access when the identifier associated with the particular binary behavior is located in a deny execution list for the particular identified security zone, instructions to select the other security setting to permit access when execute binary behaviors is enabled in the particular identified security zone, and instructions to select the particular security setting to deny access when execute binary behaviors is disabled in the particular identified security zone.

12. The computer readable storage medium of claim 7, further comprising computer-executable instructions configured to identify the security zone for the binary behavior comprising:
instructions to evaluate a reference identifier that is associated with the binary behavior;
instructions to identify a uniform resource locator associated with the reference identifier; and
instructions to map the identified uniform resource locator to the security zone.

13. The computer readable storage medium of claim 7, further comprising computer-executable instructions configured to identify the security zone for the binary behavior comprising:
instructions to recursively evaluate reference identifiers that are associated with the binary behavior;
instructions to identify a uniform resource locator from the recursively evaluated reference identifiers; and
instructions to map the identified uniform resource locator to the security zone.

14. A system configured to cast security on a binary behavior that is associated with content from a remote computing device, comprising:
a local computing device, wherein the content is communicated from the remote computing device to the local computing device over a communication medium, and wherein the local computing device is configured to perform a method comprising:
parsing the content, the content including multiple elements having attached binary behaviors that comprise one or more compiled non-script-based languages, to build an element tree including identified elements on the local computing device and behaviors associated with the identified elements, the binary behaviors configured using the one or more compiled non-script-based languages to enable access to an operating system on the local computing device;
processing at least one selected element from the identified elements on the local machine to render a behavior of the selected element by:
identifying a binary behavior that is associated with the selected element and is configured to cause execution of a binary executable separate from the content;
mapping a security zone to the identified binary behavior;
retrieving a security setting associated with the binary behavior in the mapped security zone; and
selectively denying execution of the binary executable by the local computing device based on the retrieved security setting; and
responsive to a determination that the binary executable is resident on the local computing device:
bypassing the mapping, retrieving, and selectively denying; and
enabling local execution of the binary executable.

15. The system of claim 14, wherein processing a selected element from the identified elements on the local machine further comprises:
requesting the binary executable from the remote computing device over the communication medium when the binary behavior for the selected element is granted access within the retrieved security setting.

16. The system of claim 14, wherein processing a selected element from the identified elements on the local computing device further comprises:
requesting execution of the binary executable that is associated with the identified binary behavior for the selected element; and
initiating execution of the binary executable on the local computing device when the identified binary behavior for the selected element is granted access within the retrieved security setting.

17. The system of claim 14, wherein the binary executable is available for download from the remote computing device.

* * * * *

UNITED STATES PATENT AND TRADEMARK OFFICE
CERTIFICATE OF CORRECTION

| | | |
|---|---|---|
| PATENT NO. | : 7,743,425 B2 | |
| APPLICATION NO. | : 10/836417 | |
| DATED | : June 22, 2010 | |
| INVENTOR(S) | : Shankar Ganesh et al. | |

It is certified that error appears in the above-identified patent and that said Letters Patent is hereby corrected as shown below:

In column 7, line 39, in Claim 1, delete "script based" and insert -- script-based --, therefor.

Signed and Sealed this
First Day of February, 2011

David J. Kappos
*Director of the United States Patent and Trademark Office*